(12) United States Patent
Camenisch et al.

(10) Patent No.: US 8,341,416 B2
(45) Date of Patent: Dec. 25, 2012

(54) ASSERTION MESSAGE SIGNATURES

(75) Inventors: Jan Leonhard Camenisch, Thalwil (CH); Thomas R. Gross, Zurich (CH); Dieter M. Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/301,788

(22) PCT Filed: Apr. 26, 2007

(86) PCT No.: PCT/IB2007/051546
§ 371 (c)(1),
(2), (4) Date: Sep. 30, 2010

(87) PCT Pub. No.: WO2007/135580
PCT Pub. Date: Nov. 29, 2007

(65) Prior Publication Data
US 2011/0013771 A1      Jan. 20, 2011

(30) Foreign Application Priority Data

May 21, 2006   (EP) .................................... 06010468

(51) Int. Cl.
*H04L 9/32* (2006.01)
(52) U.S. Cl. .............. 713/180; 380/46; 380/28; 380/30; 705/51; 726/27; 713/179
(58) Field of Classification Search ............. 380/46, 380/28, 30; 705/51; 726/27; 713/179
See application file for complete search history.

(56) References Cited

U.S. PATENT DOCUMENTS
5,231,668 A * 7/1993 Kravitz .......................... 380/28

2003/0059041 A1* 3/2003 MacKenzie et al. ............ 380/28
2003/0225697 A1* 12/2003 DeTreville ...................... 705/51
2006/0174350 A1* 8/2006 Roever et al. .................. 726/27
2010/0138662 A1* 6/2010 Ikeda ............................ 713/179

FOREIGN PATENT DOCUMENTS
WO           95/30292           11/1995

OTHER PUBLICATIONS

Anonymity and Security Support for Persistent Enterprise Conversation Changjie Wang; Dickson K.W. Chiu; Ho-fung Leung. Enterprise Distributed Object Computing Conference, 2006. EDOC '06. 10th IEEE International (1541-7719) (0-7695-2558-X) 2006. p. 471-476.*
Anonymity and security in public Internet forums Changjie Wang; Chiu, D.K.W.; Ho-fung Leung. E-Commerce Technology, 2005. CEC 2005. Seventh IEEE International Conference on (1530-1354) (0-7695-2277-7) 2005. p. 448-451.*
Yaksha: augmenting Kerberos with public key cryptography Ganesan, R. Network and Distributed System Security, 1995., Proceedings of the Symposium on (0-8186-7027-4) 1995. p. 132-143.*

* cited by examiner

*Primary Examiner* — Taghi Arani
*Assistant Examiner* — Angela Holmes
(74) *Attorney, Agent, or Firm* — William Stock; Anne Vachon Dougherty (57) ABSTRACT

The invention relates to a method for providing an assertion message (200) from a proving party (20) to a relying party (40), the method comprising the steps of: —creating an assertion (A) comprising one or more statements, —creating an assertion proof (p A), —creating a temporary private key and a corresponding temporary public key (K) from the assertion (A) and the assertion proof (p A), —creating a key proof (PK) for the temporary public key (K), —creating an assertion message signature (S) by means of the temporary private key, —creating the assertion message (200) comprising the temporary public key (K), the assertion proof (PA), the key proof (PK), the assertion (A), a message body (220) and the assertion message signature (S) to the relying party (40).

14 Claims, 6 Drawing Sheets

WS - security header         600

```
...
<wsse:Security>
   <cred:ProofToken wsu:Id="endorsed_claims"
        xmlns:cred="www.ibm.com/IdemixProofToken"
      <AssertionFormat format="www.ibm.com/IdemixAssertionFormat"
      <cred:Proof>
         ...
      </cred:Proof>
      <!-- Reference to the assertion -->

<AssertionReference URI="#assertion_token"/>
   </cred:ProofToken>                                                        } 610

<cred:Assertion wsu:Id="assertion_token">
      ...
   </cred:Assertion>                                                         } 620

<cred:TemporaryPublicKey wsu:Id="temp_public_key">
      <cred:AssociatedEndorsedClaims>
         <wsse:Reference URI="#endorsed_claims"/>
      </cred:AssociatedEndorsedClaims>
      <cred:KeyMaterial>
         ...
      </cred:KeyMaterial>
   </cred:TemporaryPublicKey>                                                } 630

<ds:Signature>
      <ds:SignedInfo>
         ...
         <!-- signature over message -->
      </ds:SignedInfo>
      <ds:SignatureValue>
         ...
      </ds:SignatureValue>
      <ds:KeyInfo>
         <!-- Reference to key -->
         <wsse:SecurityTokenReference>
            <wsse:Reference URI="#temp_public_key"/>
         </wsse:SecurityTokenReference>
      </ds:KeyInfo>
   </ds:Signature>
</wsse:Security>                                                             } 640
...
```

ASSERTION MESSAGE SIGNATURES

TECHNICAL FIELD

The present invention is related to methods, a system, a transmitting entity, a receiving entity, a computer program, a signal and an assertion message format for providing an assertion message from a proving party to a relying party.

BACKGROUND OF THE INVENTION

Users become more and more concerned about their privacy when browsing the Internet or performing other kinds of electronic transactions. Hence a secure and improved management of the identity of the users has growing demand. Identity management in its widest sense means management of all the personal information about a person, including at least all the person's digital relations. Business cases are e.g. the reduction of user-management cost and a general boost of electronic business. Identity management is an infrastructure issue where a standard, like the Internet and web standards, may benefit almost all parties. Today's most important on-line transactions require a user to provide her identity or certain attributes to the service provider. As a prevalent approach users enter uncertified attributes in web forms, which implies that service providers request more attributes than required for the business process itself. The service providers use the additional information to check the provided attributes for consistency.

Federated identity management (FIM) protocols have multiple advantages over this approach. The service provider can obtain precisely the attributes required and have these attributes certified by a trusted identity provider. The FIM protocols follow the scheme to send a requestor acting on behalf of a user to an identity provider where the user authenticates and obtains a credential for the attributes requested by the service provider. The FIM approach may enhance the user's privacy by following the data minimization principle, i.e. that only user data required for the service are transmitted. FIM provides widely-deployed and standardized protocols with benefits in terms of security of attributes and privacy of the users.

Anonymous credential systems provide even stronger methods for identity management and attribute exchange. This concept was introduced by D. Chaum in "Security without identification: Transaction systems to make big brother obsolete. Communications of the ACM, 28(10):1030.1044, October 1985." The key property of anonymous credential systems is that the issuing transaction for an anonymous credential is unlinkable to its show transaction. This allows a user to keep an anonymous credential secret and use it multiple times to provide certified attribute data to relying parties. An advanced anonymous credential system is disclosed in "J. Camenisch and A. Lysyanskaya, Efficient non-transferable anonymous multi-show credential system with optional anonymity revocation, in B. Pfitzmann, editor, Advances in Cryptology, EUROCRYPT 2001, volume 2045 of LNCS, pages 93.118. Springer Verlag, 2001." This advanced anonymous credential system allows that even multiple shows of the same credential be unlinkable to each other. This system was further generalized to so-called private certificate systems that allow the user to selectively show statements regarding identity attributes that are stored in a single credential and support more differentiated attributes, the show of arbitrary logical formulas over those attributes, and the integration of verifiable encrypted attributes and cryptographic commitments of attributes. When asserting attributes with this system, the identity provider need not be involved in the transaction. The user obtains her private certificates ahead of time and stores them locally. Whenever the user wants to provide certified attributes to a service provider, she uses one or more private certificates to generate a new proof to show a logical formula over the attributes in her private certificate.

The generalized system mentioned above is based on zero-knowledge proofs of knowledge. Current signature standards, in particular public key signature standards such as the stable and well-established standard for XML Signatures, are not compatible with zero knowledge proofs (Donald Eastlake, Joseph Reagle, David Solo (eds.): XML-Signature Syntax and Processing, W3C Recommendation, 2002, available from http://www.w3.org/TR/xmldsig-core/). However, XML-signatures are the basis for most FIM and Web Services (WS)-Security frameworks.

It is an object of the invention to provide improved solutions for identity management.

SUMMARY AND ADVANTAGES OF THE INVENTION

The present invention is directed to methods, a system, a transmitting entity, a receiving entity, a computer program, a signal and an assertion message format as defined in independent claims. Further embodiments of the invention are provided in the appended dependent claims.

According to one aspect of the present invention, there is presented a method for providing an assertion message from a proving party to a relying party, the method comprising the steps of:
  creating an assertion comprising one or more statements,
  creating an assertion proof,
  creating a temporary private key and a corresponding temporary public key from the assertion and the assertion proof,
  creating a key proof for the temporary public key,
  creating an assertion message signature by means of the temporary private key,
  creating the assertion message comprising the temporary public key, the assertion proof, the key proof, the assertion, a message body and the assertion message signature.

In the method according to this aspect of the invention the key pair of a temporary private key and a temporary public key is created from the assertion and the assertion proof This binds the assertion and the assertion proof to the message body.

The statements of the assertion may regard to any attribute of the proving party. As an example, the statement may comprise information about the identity of the proving party such as information about the age, the residence, the nationality or the credit card of the proving party. The statements about attributes of the proving party might be specified as a logical formula.

A traditional public key signature requires a public key certificate to be sent together with the signature. As an analogy, the assertion, the assertion proof and the temporary public key according to this aspect of the invention may be considered to correspond to the public key certificate of a traditional public key signature scheme.

The proving party may be any entity that wants to provide statements about its attributes to a relying party. As an example, a proving party could be a user of a network such as the internet. In other cases, the proving party may be a hardware device that proves properties about itself or a intermediary party enriching communication by property proofs.

An assertion proof provides a cryptographic proof of the statements made in the assertion. By means of the assertion proof the statements made in the assertion can be verified by the relying party.

The assertion could be implied by the assertion proof without being explicitly stated.

A relying party can be any entity that requests information about a proving party. As an example, a relying party could be a service provider that offers services via the internet.

The assertion message signature is created by means of the temporary private key. By means of the assertion message signature the assertion and the assertion proof can be bound securely to the message body of the message.

Finally, the assertion message is created comprising the assertion, the assertion proof, the temporary public key, the key proof, the main message body and the assertion message signature. The assertion message may then be sent to the relying party.

This method has the advantage that it allows the exchange of an assertion and a corresponding assertion proof by means of methods or protocols that require private key/public key signatures.

According to an embodiment of the invention the temporary private key, the temporary public key and the key proof are created by means of a secure binding function.

A secure binding function is understood as a function that allows the verification that the temporary key pair comprising the temporary private key and the temporary public key was generated pseudo-randomly, randomly or unpredictable from the assertion proof and the assertion. In other words, the secure binding function binds the temporary key pair and the assertion message signature created by means of the temporary key pair respectively to the assertion and the assertion proof. In other words, the secure binding function is used for generating the temporary private key and for making the correctness proof over the corresponding temporary public key that is used as a cryptographic commitment of the temporary private key.

According to an embodiment of the invention the secure binding function is a verifiable random function.

A verifiable random function allows a party to generate a secret value by application of the verifiable random function to a commonly known value. The mathematical structure of a verifiable random function allows that the party can create a proof that the secret value has been generated accordingly. By means of the verifiable random function the temporary private key and the temporary public key are pseudo-randomly and freshly generated for the respective assertion and assertion proof.

According to this embodiment the key proof proves that the temporary key pair was created by applying the secure binding function, in particular the verifiable random function, on the assertion, the assertion proof and optionally other input parameters such as a time stamp.

According to an embodiment of this aspect of the invention the assertion message signature comprises the sub-steps of
creating an assertion message digest of one or more parts of the assertion message,
creating the assertion message signature from the assertion message digest by means of the temporary private key.

This improves the efficiency of the signature generation, in particular for the signature of large amounts of information. The assertion message digest should be created from all the parts of the assertion message that shall be signed. According to a further embodiment of the invention the assertion message digest is calculated by means of a hash function.

According to a further embodiment of this aspect of the invention the assertion message signature is an enveloped signature. Such an enveloped signature creates a digest from the whole assertion message. This has the advantage that all parts of the message are signed by the enveloped signature.

According to a further embodiment of this aspect of the invention the assertion proof and/or the key proof is a zero knowledge proof. This has the advantage that the proving party does not have to reveal its identity to the relying party. It can stay completely anonymous. It allows the proving party to selectively provide statements about herself while staying completely unlinkable over multiple transactions.

According to a further embodiment of the invention the assertion proof and/or the key proof is a minimum disclosure proof. This has the advantage that it enlarges the number of algorithms that can be used and offers simple implementation solutions.

According to a further embodiment of the invention the assertion proof and/or the key proof is a non-interactive proof. A non-interactive proof can be established by applying e.g. the Fiat-Shamir heuristics to interactive zero-knowledge proofs. As these non-interactive protocols do not require any interaction, the non-interactive proofs fit into a single assertion message.

According to a further embodiment of the invention the temporary public key and the temporary private key are a Digital Signature Algorithm (DSA) key pair.

DSA is a widely used signature algorithm. The method according to the invention allows the combination of zero knowledge or minimum disclosure protocols with such DSA-signatures.

According to a further embodiment of the invention the assertion message signature is a signature according to the Extended Markup Language Digital Signature (XML-DSIG) standard. The XML-DSIG signature standard is the signature standard of many web services standards, e.g. the WS-security standard.

According to a further embodiment of the invention the verifiable random function is the function as proposed by Dodis and Yampolsky.

The use of this verifiable random function is a very efficient solution.

A detailed description of this verifiable random function is given in "Y. Dodis and A. Yampolsky. A Verifiable Random Function with Short Proofs and Keys. In Public Key Cryptography, volume 3386 of LNCS, pages 416.431, 2005."

This function comprises already a key proof based on bilinear maps.

Instead of this key proof based on bilinear maps a non-interactive zero knowledge proof of knowledge of discrete logarithms can be used.

According to a further embodiment of the invention the assertion proof is derived from one or more private certificates of the proving party. A private certificate system is a generalization of an anonymous credential system in that sophisticated attribute statements are supported. A private certificate system allows for obtaining private certificates from an identity provider and use them to make certified statements, both issuing and using being possible in a privacy-enhancing way. A user or proving party obtains private certificates from identity providers and holds these certificates locally. Certificates can have long lifetimes, e.g., multiple years. A certificate, once obtained, is never sent to a relying party. Whenever the user needs to provide assertions with statements regarding attributes to a relying party, she uses one or multiple of her private certificates to release partial information on their third party-endorsed attributes in a controlled way. This release can be performed without involving the identity provider.

According to a further embodiment of the invention the method is performed in a Federated Identity Management (FIM)-system. Federated identity management (FIM) protocols are protocols between three types of players. A user (proving party), whose identity is to be federated, an identity provider who certifies the identity and a relying party who is the recipient of the user's identity. Today's standardized and established FIM protocols typically make use of signed assertion tokens being conveyed from the identity provider to the user and from the user to the relying party. A prominent example for such a protocol is the WS-Federation Active Requestor Profile as specified in "C. Kaler and A. Nadalin. (eds.). WS-Federation: Active Requestor Profile, Version 1.0, July 2003. http://www-128.ibm.com/developerworks/library/". The latter is based on security assertions contained in WS-Security messages. Whenever the identity of the user is required, a security assertion is obtained by the requestor (proving party) from the identity provider and then relayed to the relying party. This allows for the properties that i) the attributes are certified by the identity provider and ii) exactly the required attributes are conveyed to the relying party. The first property provides security for the relying party, the second one privacy for the user (proving party).

According to a second aspect of the invention there is provided a method for evaluating an assertion message, the assertion message comprising an assertion with one or more statements, an assertion proof for the assertion, a temporary public key created from the assertion and the assertion proof, a key proof for the temporary public key, a message body and an assertion message signature, the method comprising the steps of:
  checking the temporary public key by means of the key proof,
  checking the assertion by means of the assertion proof,
  checking the assertion message signature by means of the temporary public key
  evaluating the assertion message as valid if the result of the check of the assertion message signature, the temporary public key and the assertion is positive.

A relying party that receives an assertion message has to check the validity of the temporary public key, the validity of the assertion and the validity of the assertion message signature in order to evaluate the validity of the assertion message.

Preferably, the assertion message signature comprises a reference to the temporary public key, the temporary public key a reference to the corresponding key proof and the key proof a reference to the assertion and the assertion proof Then the reference to the temporary public key can be extracted from the assertion message signature and the reference to the key proof from the temporary public key. The temporary public key can be verified by means of the key proof Following the reference to the assertion and the corresponding assertion proof, the statements made in the assertion can be verified by means of the assertion proof Then the assertion message signature can be verified by means of the temporary public key.

It should be noted that the steps of the different aspects of the invention can be performed in different orders. Furthermore, the steps may also be combined, i.e. that e.g. two or more steps are performed together.

Another aspect of the invention relates to a computer program comprising instructions for carrying out the steps of the method according to any one of claims 1 to 13 when said computer program is executed on a computer system.

Another aspect of the invention relates to a transmitting entity for transmitting an assertion message from a proving party to a relying party, the transmitting entity being provided for
  creating an assertion comprising one or more statements,
  creating an assertion proof,
  creating a temporary private key and a corresponding temporary public key from the assertion and the assertion proof,
  creating a key proof for the temporary public key,
  creating an assertion message signature by means of the temporary private key,
  sending the assertion message comprising the temporary public key, the assertion proof, the key proof, the assertion, a main message body and the assertion message signature to the relying party.

Such a transmitting entity could be e.g. a computer of the proving party.

Another aspect of the invention relates to a receiving entity for receiving an assertion message from a proving party, the assertion message comprising an assertion with one or more statements, an assertion proof for the assertion, a temporary public key created from the assertion and the assertion proof, a key proof for the temporary public key, a message body and an assertion message signature, the receiving entity being provided for:
  checking the temporary public key by means of the key proof,
  checking the assertion by means of the assertion proof,
  checking the assertion message signature by means of the temporary public key
  evaluating the assertion message as valid if the result of the check of the assertion message signature, the temporary public key and the assertion is positive.

Such a receiving entity could be e.g. a server of the relying party.

Another aspect of the invention relates to a signal comprising an assertion message, wherein the assertion message comprises a message header and a message body, wherein the message header comprises an assertion with one or more statements, an assertion proof, a temporary public key created from the assertion and the assertion proof, a key proof for the temporary public key and an assertion message signature created by means of a temporary private key corresponding to the temporary public key.

Another aspect of the invention relates to an assertion message format, specifying the format of an assertion message, wherein the assertion message according to the format comprises a message header and a message body, wherein the message header comprises an assertion with one or more statements, an assertion proof, a temporary public key created from the assertion and the assertion proof, a key proof for the temporary public key and an assertion message signature created by means of a temporary private key corresponding to the temporary public key.

Another aspect of the invention relates to a system, comprising a transmitting entity according to claim 15 and a receiving entity according to claim 16.

The above presented different aspects of the invention provide a generic construction that enables the transfer of the semantics of zero-knowledge proof-based protocols like private certificate systems to public-key signature systems such as XML-DSIG keys and signatures. As public key-signature systems are widely used and mandatory according to a lot of industry standards, in particular Web Services (WS)-Security standards, the invention is broadly applicable.

The different aspects of the invention allow the integration of private certificate systems into WS-Security and therefore enable a new WS-Federation Active Requestor profile with improved privacy properties.

In particular, the above presented different aspects of the invention enable the provision of systems that fulfill the following requirements:

(a) not to change the XML-DSIG Standard as it is already stable and changes toward zero-knowledge proofs may complicate the XML-DSIG semantics beyond manageability.

(b) not to resort to an extremely wide interpretation of standard parts beyond its original intensions and even to violations of its intended semantics.

This offers the possibility to seamlessly integrate private certificate systems with existing standards semantics in the WS-security environment.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

GLOSSARY

The following are informal definitions to aid in the understanding of the description.

User or proving party: An entity whose identity is managed. Typically the user or proving party is an individual, but at least small businesses will often interact with other businesses just like individuals, e.g., in travel booking and information gathering. In other cases, the proving party may be a hardware device that proves properties about itself or a intermediary party enriching communication by property proofs.

Relying party: An entity, e.g. an organization represented e.g. by a server, who wants to know a name or attributes of a user or proving party. Organizations include all a person's communication partners such as banks, doctors, colleagues, internet service providers and family.

Identity provider: An entity that stores identity-related information for a person. This might be a bank, a certificate authority (CA), an Internet Service provider etc.

The term computer includes devices like PCs but also digital assistants, mobile phones and other electronic devices.

DETAILED DESCRIPTION

Figure 1:
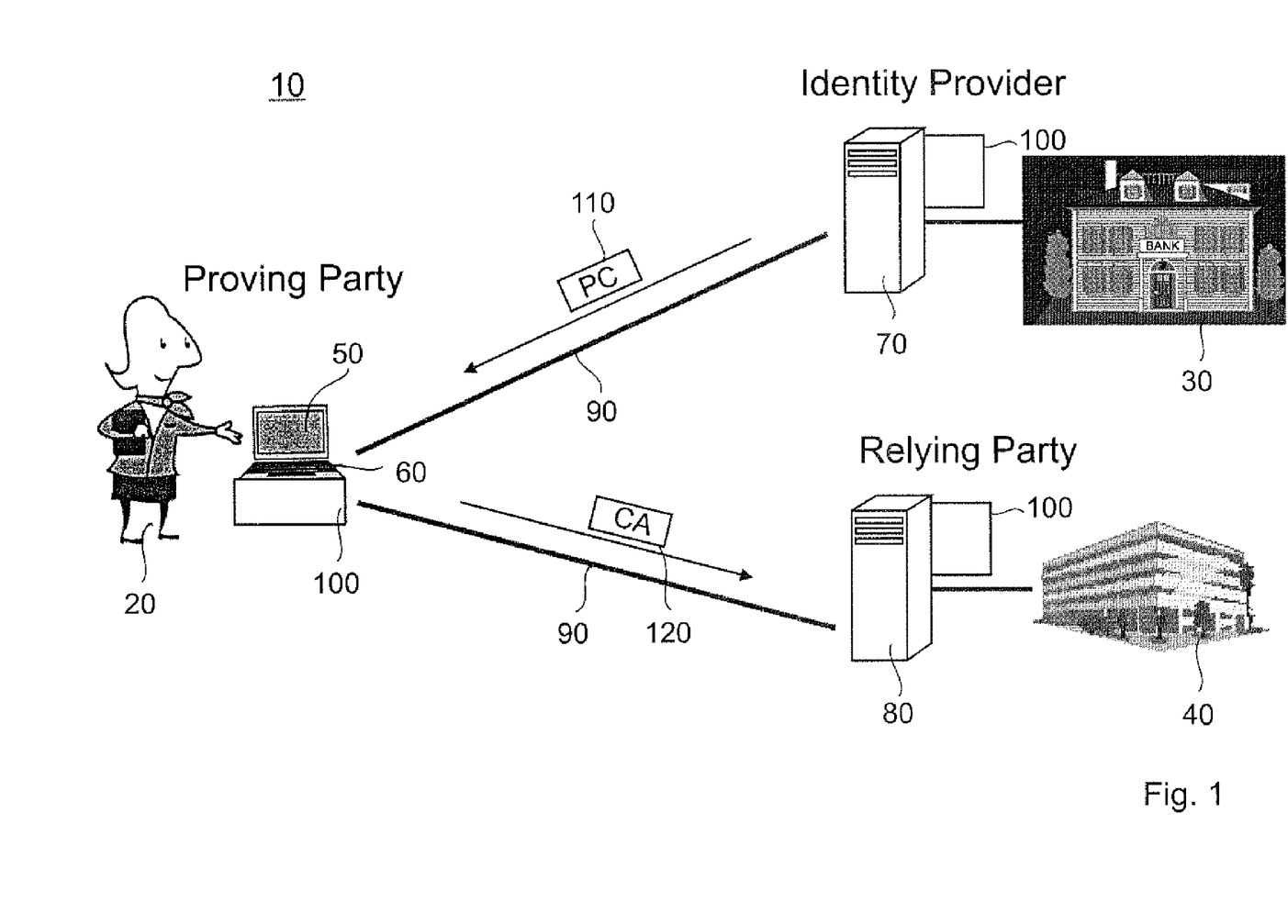
FIG. 1 shows a schematic illustration of a system according to an embodiment of the present invention.

With reference to FIG. 1, the general layout of a system 10 according to an exemplary embodiment of the invention is described. In the figures, same reference signs are used to denote the same or like parts. The system comprises a proving party 20, an identity provider 30 and a relying party 40. In this example the proving party 20 is a user that wants to perform a transaction, e.g. a purchasing transaction, with the relying party 40. The proving party 20 executes a client application 50, e.g. a web browser, on a computer 60. The identity provider 30 runs a server 70 and the relying party 40 runs a server 80. The computer 60 is connectable to the server 70 of the identity provider 30 as well as to the server 80 of the relying party 40 via communication lines 90. The communication lines 90 are usually provided through a network, e.g. the Internet. The identity provider 40 can be e.g. a bank or another professional organization which offers identity management services. The identity provider 30 is in general provided for issuing identity-related information (IRI). Under the term identity-related information IRI is understood any information related to a person or user. Identity-related information IRI comprises names, addresses, group memberships, authorization credentials, demographic data, personal preferences, calendar entries, medical and financial information, and everything else that may be stored digitally about a person or under a user name. The proving party 20 may desire such IRI e.g. for access control, authorization, personalization, authentication, login, commercial, medical, governmental or other issues. The identity provider 30 is in particular provided for the issuance of attribute credentials, also denoted private certificates or user certificates. The server 70 of the identity provider 30, the computer 60 of the proving party 20 and the server 80 of the relying party 80 comprise a private certificate system plugin 100. This private certificate system plugin 100 facilitates the system 10 to work as a private certificate system. A private certificate system is a generalization of an anonymous credential system in that sophisticated assertions regarding attribute statements are supported. The proving party 20 may obtain one or more private certificates 110 from the identity provider 30. The private certificates 110 may be stored locally on the computer 60 of the proving party 20. The proving party 20 can use the private certificates 110 to create certified assertions 120. The certified assertions 120 comprise assertions with statements about attributes of the proving party 20 and a corresponding assertion proof. By means of sending these certified assertions 120 to the relying party 40, the proving party 20 can prove these assertions to the relying party 40 while staying completely anonymous and unlinkable. The proof for the assertions can e.g. be established by means of a non-interactive zero knowledge or a non-interactive minimum disclosure proof.

Figure 2:
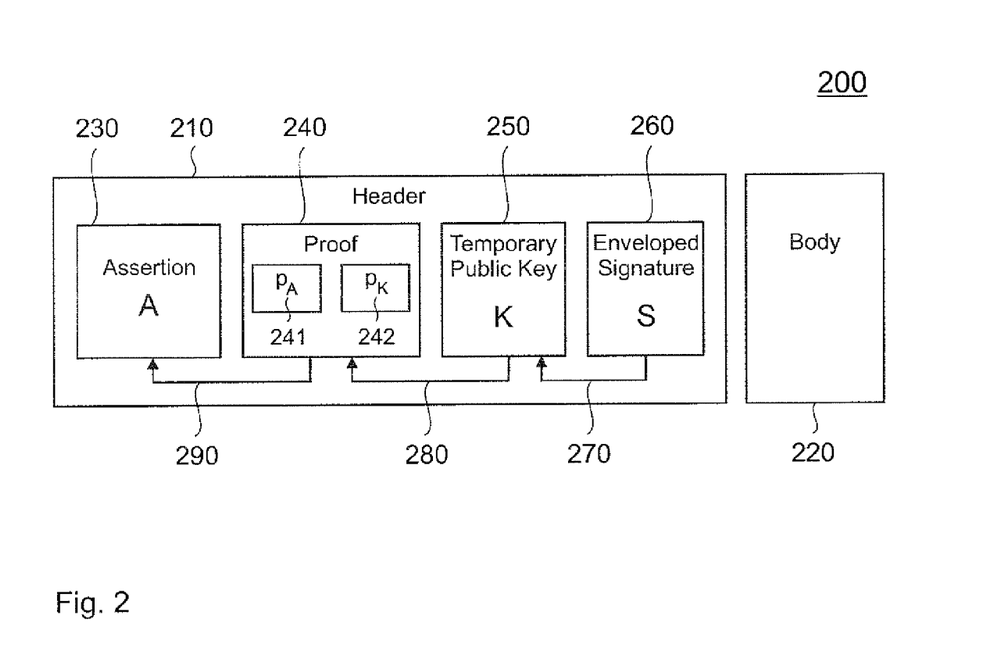
FIG. 2 shows a schematic illustration of the message flow of an embodiment according to the present invention.

FIG. 2 shows a schematic illustration of the format of an assertion message 200 according to an exemplary embodiment of the present invention. The assertion message 200 is a preferred embodiment of the certified assertion 120 as described with reference to FIG. 1. It comprises a message header 210 and a message body 220. The message header 220 comprises an assertion token 230 with an assertion A, a proof token 240, a temporary public key token 250 with a temporary public key K and an enveloped signature token 260 with a signature S. The proof token 240 comprises an assertion proof token 241 with an assertion proof $p_A$ for the assertion and a key proof token 242 with a key proof $p_K$ for the temporary public key K. The enveloped signature token 260 comprises a reference 270 to the temporary public key token 250. The temporary public key token 250 comprises a reference 280 to the proof token 240 and the proof token 240 comprises a reference 290 to the assertion token 230. The message header 210 may comprise further elements or tokens. The message body 220 may comprise all kind of messages, e.g. requests for accessing services of the relying party 40 of FIG. 1.

The computer 60 may act as a transmitting entity for transmitting the assertion message 200 from the proving party 20 to the relying party 40.

The server 80 may act as a receiving entity for receiving and verifying the assertion message 200.

The scenario in FIG. 1 is shown to facilitate the description of the following flows for providing an assertion message 200 as shown in FIG. 2 from the proving party 20 to the relying party 40.

Figure 3:
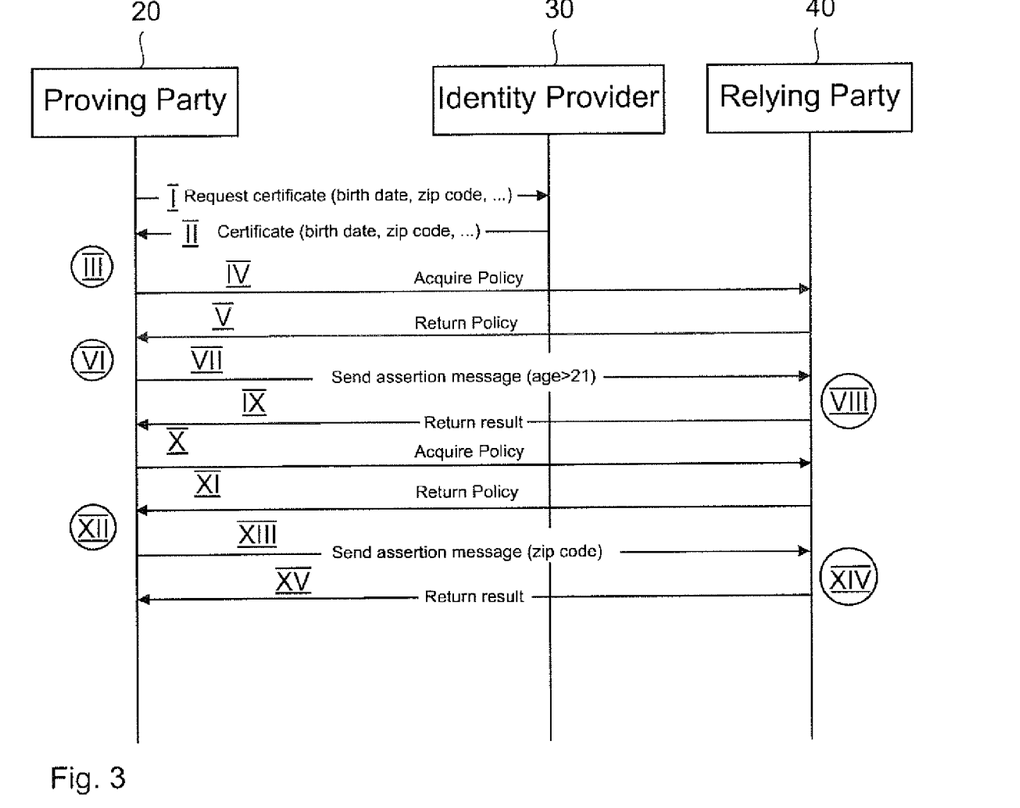
FIG. 3 shows a schematic illustration of an assertion message according to an embodiment of the present invention.

FIG. 3 shows a schematic illustration of a message flow of an exemplary embodiment of the invention. Therein, the message flow between the proving party 20, the identity provider 30 and the relying party 40 is depicted with labeled arrows to which respective Roman numbers are assigned. Further steps or sub-steps are indicated by Roman numbers in a circle. The flow is understood as being performed sequentially from top to bottom as indicated by the increasing Roman numbers. However, it should be noted that there may be multiple instances of this protocol run in parallel without specified ordering.

In step I the proving party 20 requests a private certificate comprising e.g. the birth date, the zip code and further information about the identity of the proving party 20 from the identity provider 30. The identity provider 30 issues the requested private certificate and sends it in step II back to proving party 20. In step III the proving party 20 stores the private certificate on the computer 60. Steps I and II may be repeated several times, i.e. the proving party 20 may store several private certificates on the computer 60.

If the proving party 20 wants to use a service of the relying party 40, it sends in step IV a request to acquire the policy for the desired service to the relying party 40. In step V the relying party 40 sends the policy back the proving party 20. In this example we assume that the policy for the requested service requires a proof of the user to be older than 21. In step VI the proving party 20 analyses the received policy and compares it with the available private certificates 110 stored on the computer 60. If one or more suitable private certificates 110 are available, the user or proving party 20 respectively may select it and by means of the private certificate system plugin 100 of the computer 60 an assertion message such as the assertion message 200 as shown in FIG. 2 is created. In this example the assertion message comprises the assertion that the proving party 20 is older than 21. This assertion and the corresponding assertion proof can be derived from the birth date of the private certificate. In step VII the assertion message is sent from the proving party 20 to the relying party 40. After the receipt of the assertion message the relying party 40 checks in step VIII the assertion message for validity. If the assertion message has been verified as valid, the relying party 40 sends a result, e.g. the requested information, to the proving party 20 in step IX. The requested information could be e.g. a webpage that is only accessible for persons older than 21.

If the proving party 20 wants to use another service of the relying party 40, it may send in step X a further request to acquire the policy for the desired service to the relying party 40. In step XI the relying party 40 sends the policy back the proving party 20. In this example we assume that the policy for the requested service requires a proof of the zip code of the proving party 20. In step XII the proving party 20 analyses the received policy and compares it with the available private certificates 110 stored on the computer 60. If a suitable private certificate 110 is available, the user or proving party 20 respectively may select it and by means of the private certificate system plugin 100 of the computer 60 a certified assertion, i.e. an assertion and a corresponding assertion proof, is created. In this example the certified assertion comprises the information that the proving party 20 has the indicated zipcode. Furthermore, the private certificate system plugin 100 of the computer 60 creates another assertion message that comprises the certified assertion. In step XIII the assertion message is sent from the proving party 20 to the relying party 40. After the receipt of the assertion message the relying party 40 checks in step XIV the assertion message for validity. If the assertion message has been verified as valid, the relying party 40 sends a result, e.g. the requested information, to the proving party 20 in step VX.

The assertion message format of FIG. 2 can be used to integrate an authentication with a private credential system into a standard public key signature scheme like XML-DSIG. This can be established by transferring the authentication with the private credential into the authentication with a temporary public key/private key signature with which an XML-DSIG-signature can be generated. For this authentication transfer the security model assumes that the proving party 20 is not trusted by the relying party 40. Therefore, it should be enforced that the proving party 20 either chooses the temporary signature key pair faithfully according to the protocol or that the verification aborts. This can be implemented by setting the requirement that the proving party always chooses a pseudo-random and fresh temporary signature key pair for each single certified assertion.

This property of the temporary signature key pair prevents that a malicious proving party 20 may attempt to use a temporary signature key pair multiple times, mis-bind key pairs of other principals or binds a single key pair to multiple credentials. According to this embodiment of the invention an authentication statement made with a private credential system (e.g., the proving party 20 has the attributes att='is older than 21') is transformed to an assertion comprising the following statements:

(a) The proving party 20 has the attributes att (e.g., 'is older than 21').

(b) The proving party 20 holds the temporary private key Ks that corresponds to a temporary public key K.

(c) The key pair (Ks; K) is pseudo-random and freshly generated for this assertion.

For each statement made with e.g. a zero-knowledge proof-based protocol by the proving party 20 it can be guaranteed that a new temporary key pair is freshly and pseudo-randomly generated. Furthermore, by means of a verifiable pseudo-random function and a corresponding zero-knowledge proof stating that the temporary public key was computed correctly, it can be guaranteed that the proving party 20 created the temporary key pair faithfully. The one-timeness of the temporary key pair allows for the unlinkability of transactions This temporary key pair can be used to create XML signatures with semantics extended by the proved assertions. The proved assertions are manifest in three token types: the assertion token 230, the proof token 240 and the temporary public key token 250. The temporary public key token 250 is associated with statements regarding the properties and faithful generation of the temporary key pair. The assertion token 230 provides additional statements about attributes of the proving party 20 that are associated with the temporary key pair. Finally, the proof token 240 holds a two-fold proof for those statements: on the one hand, the properties and faithful generation of the temporary key pair are proved; on the other hand, the additional statements of the assertion about attributes of the proving party 20 are proved.

In the following the creation and verification of assertion messages will be explained in more detail.

As prerequisites it is assumed that G is a prime order q cyclic group and g a generator of it, both g and the group G are system parameters of the system 10 as shown in FIG. 1. G and g are chosen such that they can be used as public parameters of a DSA signature scheme used by all system participants, i.e. by the identity provider 30, the proving party 20 and the relying party 40. We assume that the proving party 20 has all private certificates required for the protocol to be executed. We also assume that all participants have the certificate verification keys that are required as inputs to the protocol. As prerequisites we further assume that a verifiable random function is available for all players using the system, i.e. for the proving party 20, the identity provider 30 and the relying party 40. The verifiable random function can be made available in the private certificate system plugin 100 as shown in FIG. 1. The verifiable random function is defined by the cyclic group G with prime modulus p and prime order q and a generator g for this group.

Subsequently, we describe a method which is a protocol between the proving party 20 (the signer) and the relying party 40 (the verifier). The protocol proceeds by an assertion message creation done by the proving party 20 and a verification of the assertion message done by the relying party 40.

Figure 4:
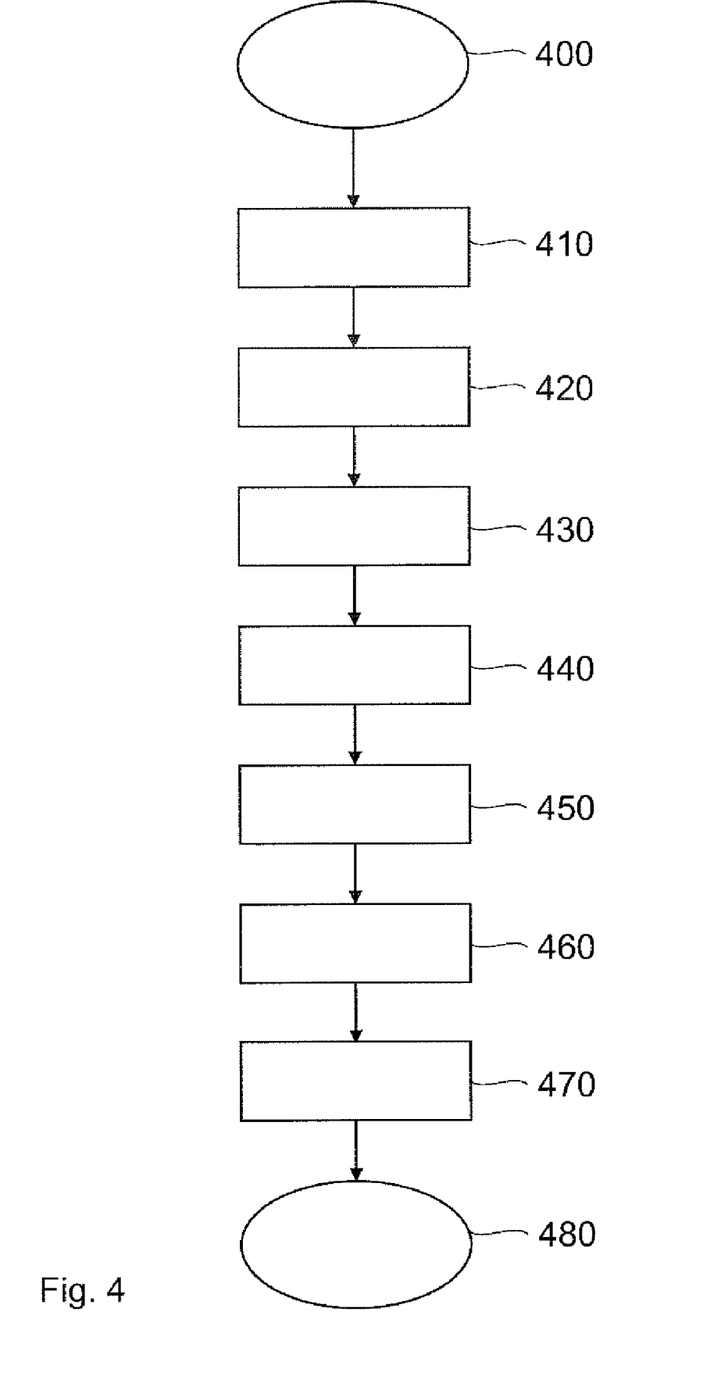
FIG. 4 shows a flowchart of the creation of an assertion message according to an embodiment of the invention.

FIG. 4 shows a flowchart of the creation of the assertion message as shown in FIG. 3 according to an exemplary embodiment of the invention.

In step 400 the proving party 20 receives the policy of the relying party 40 comprising access information for the current request (access control policy) from the relying party 40. This step 400 corresponds to the steps V and XI as described with reference to FIG. 2. In a following step 410 the received policy is analyzed with respect to the private certificates and the predefined preferences stored in the private certificate system plugin 100 of the computer 60 of the proving party 20 and with respect to input of the proving party 20.

In step 420 an assertion is created as a result of the previous step 410. Such an assertion could be e.g. the statement that the age of the proving party 20 is greater than or equal to 21.

In step 430 an assertion proof is created. According to this embodiment of the invention the assertion proof is a non-interactive zero-knowledge proof of knowledge, that is, it is a proof for the validity of the assertion, but does not convey any other information besides the validity of the assertion. The assertion proof is generated by using a subset of the private certificates 110 of the proving party 20, the assertion A, public keys of the certificate issuers and further public parameters as input A detailed description of an example of an assertion proof is given in "BANGERTER, E., CAMENISCH, J., AND LYSYANSKAYA, A. A cryptographic framework for the controlled release of certified data. Twelfth International Workshop on Security Protocols 2004 (2004), LNCS, Springer Verlag). It is incorporated by reference.

For the following explanation we assume that the variable context is the security context of an interaction, for example, the current time or a challenge from the relying party 40.

In a following step 440 a temporary DSA key pair comprising a temporary private key $K_s$ and a temporary public key K as well as a key proof $p_K$ are generated by means of using the verifiable random function of Dodis and Yampolsky with the assertion A, the assertion proof $p_A$ and the security context as input.

The step 440 comprises the following sub-steps:
a.) Compute the intermediate value m as hash of $A\|p_A\|$context using the cryptographic hash function H
b.) Choose x randomly from $\{1, \ldots, q\}$
c.) Compute the intermediate value $y:=g^x$ d.) Compute the temporary private key $K_s$ as $K_s:=1/(x+m)$ (mod q)
e.) Compute the temporary public key K as $K:=g^{\{K_s\}}$ (mod p)
f.) Compute the key proof $p_K$ as a non-interactive proof specified as follows using the notation introduced by Camenisch and Stadler in "J. Camenisch and M. Stadler. Efficient group signature schemes for large groups. In B. Kaliski, editor, Advances in Cryptology. CRYPTO '97, volume 1296 of LNCS, pages 410.424. Springer Verlag, 1997."

The computation of the key proof $p_K$ comprises the following sub-steps:
f1.) Choose a variable $r_1$ randomly from $Z_q$, wherein $Z_q$ is the set of integers from 0 ... q−1.
f2.) Choose variable $r_2$ randomly from $Z_q$
f3.) Compute $t_1:=g^{\{f_1\}}$
f4.) Compute $t_2:=g^{\{r_2\}}$
f5.) Compute $t_3:=y^{\{r_2\}}g^{\{mr_2\}}$
f6.) Compute $c:=H(t_1, t_2, t_3, y, K, g, p, q)$
f7.) Compute $s_1:=r_1+cx$
f8.) Compute $s_2:=r_2+cK_s$ The resulting key proof $p_K$ is then established by the set of (y, K, g, $s_1$, $s_2$, c).

Steps b and c create an instance of the verifiable random function. Steps d, e and f create a temporary key-pair and a key proof for the temporary key pair using the instance of the verifiable random function.

Alternatively the key proof can be based on bilinear maps.

In step 450 the assertion message 200 is partially assembled comprising the message body 210, the temporary public key token 250, the proof token 240 consisting of the assertion proof token 241 and the key proof token 242 and the assertion token 230.

In step 460 an enveloped XML Digital Signature is computed as assertion message signature over the partially assembled message of step 450 using the temporary private key $K_s$. According to an embodiment step 460 comprises a sub-step of creating an assertion message digest of the partially assembled message of step 450 by means of a Hash function H. In a following sub-step the assertion message signature (S) is computed from the assertion message digest by means of the temporary private key $K_s$.

In step 470 the assertion message signature S is added to the message header 210 of the assertion message 200. As a result, an assertion message 200 as shown in FIG. 2 is derived.

Alternatively to the enveloped signature S an assertion message signature can be created by signing only parts of the message. However, at least the assertion proof $p_A$ should be signed.

Then in a final step 480 the assertion message is sent from the proving party 20 to the relying party 40.

Figure 5:
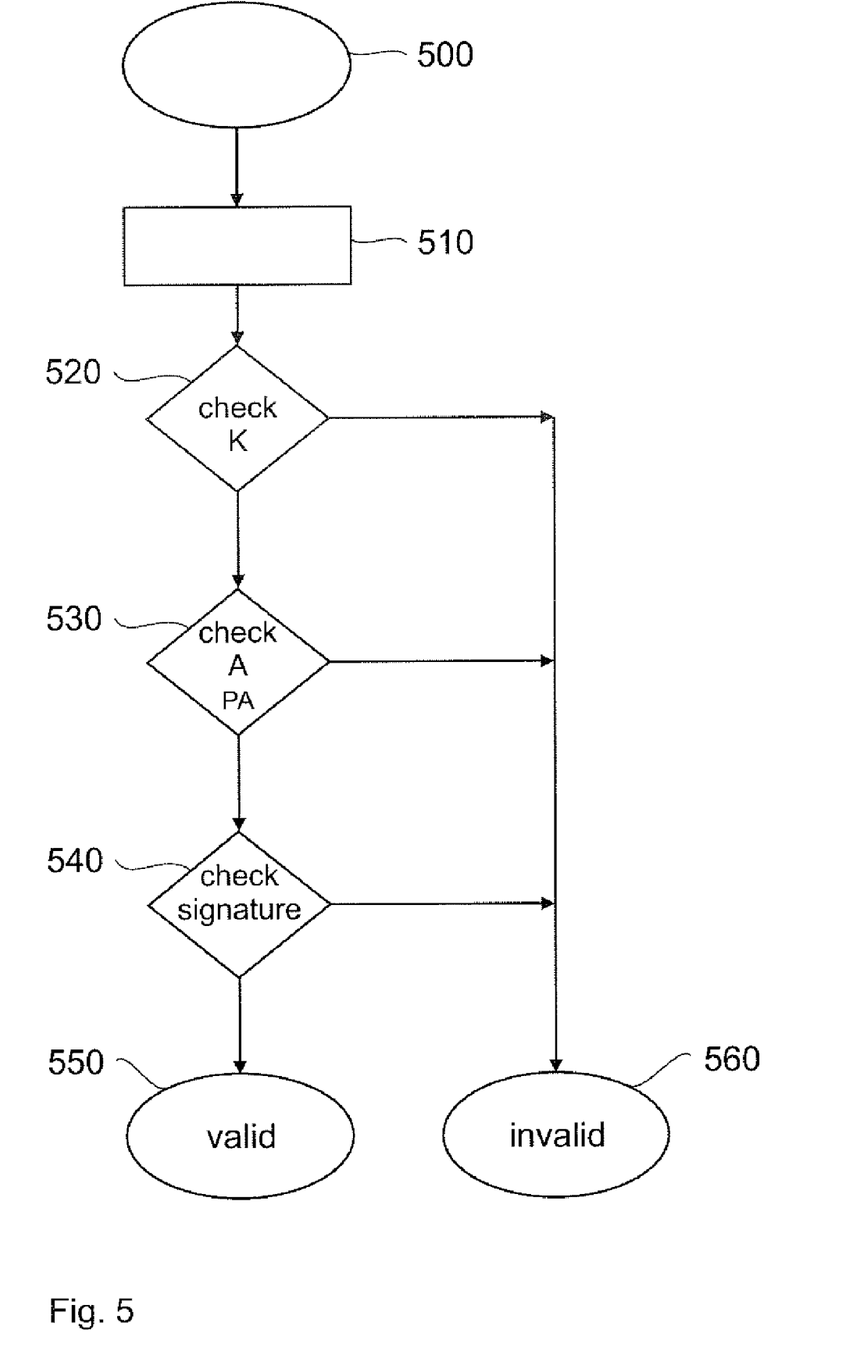
FIG. 5 shows a flowchart of the verification of an assertion message according to an embodiment of the invention.

FIG. 5 shows a flowchart of the verification of the assertion message 200 according to an exemplary embodiment of the invention. The following steps are performed by the relying party 40.

In step 500 the relying party 40 receives the assertion message 200 from the proving party 20.

In step 510 the assertion A, the assertion proof $p_A$ and the key proof $p_K$, the temporary public key K and the assertion message signature S are extracted from the assertion message 200.

In step 520 the temporary public key K is verified by means of the verifiable random function. The verifiable random function is available in the private certificate system plugin 100 of the server 80 of the relying party 40.

In a first sub-step of step 520 the intermediate value m is computed as a hash of $A\|p_A\|$ context using the cryptographic hash function H.

In a second sub-step of step 520 the zero-knowledge proof $p_K$ that proves the key correctness of the temporary public key K is verified.

The verification of the temporary public key comprises the following sub-steps:
- a1.) Compute $u_1:=y^{\{-c\}}g^{\{s_1\}}$
- a2.) Compute $u_2:=K^{\{-c\}}g^{\{r_2\}}$
- a3.) compute $u_3:=g^{\{-c\}}y^{\{s_2\}}g^{\{ms_2\}}$
- a4.) compute $c':=H(u_1, u_2, u_3, y, K, g, p, q)$
- a5.) Compare c and c' and verify the key proof $p_K$ only if c=c'.

In step 530 the assertion proof $p_A$ is verified by using a subset of the private certificates of the proving party 20, the assertion A, the public keys of the issuers of the private certificates, i.e. of the identity provider 30, and further public parameters as input.

In step 540 the assertion message signature S is verified by means of the temporary public key K.

If the result of all the checks performed in the steps 520, 530 and 540 is positive, the assertion message 200 is considered to be valid and a verification of the assertion message 200 is issued in step 550. If the result of one of the checks performed in the steps 520, 530 and 540 is negative, the assertion message 200 is considered to be invalid and the verification process is abandoned in step 560.

Figure 6:
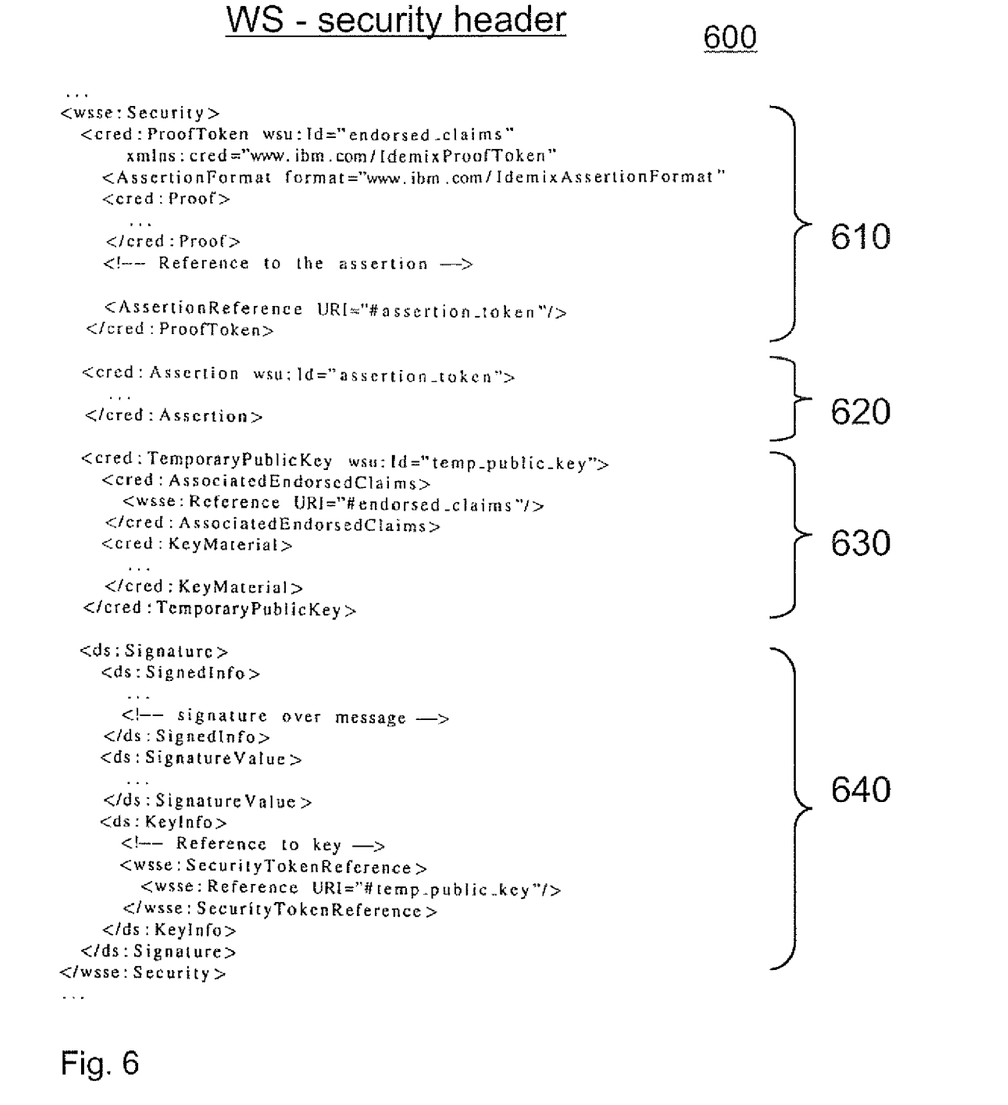
FIG. 6 shows a schematic illustration of an assertion message token according to an embodiment of the invention in the format of the WS-security standard.

FIG. 6 shows an example of a message header 600 of an assertion message that is implemented according to the WS-security standard. The example is a skeleton of the WS-Security header of a web services message. Note that in the example, the namespace wsse is the one of WS-Security, and cred the namespace for our extensions.

The message header 600 comprises a proof section 610 comprising the assertion proof and the key proof, an assertion section 620 comprising the assertion, a temporary public key section 630 comprising the temporary public key and an enveloped signature section 640 comprising the enveloped signature.

Any disclosed embodiment may be combined with one or several of the other embodiments shown and/or described. This is also possible for one or more features of the embodiments.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for a computer having at least one processor for providing an assertion message from a proving party to a relying party, the method comprising the steps of:
    creating an assertion (A) comprising one or more statements,
    creating an assertion proof (PA),
    creating a temporary private key and a corresponding temporary public key (K) from the assertion (A) and the assertion proof (PA),
    creating a key proof (PK) for the temporary public key (K),
    creating an assertion message signature (S) by means of the temporary private key, and
    creating the assertion message comprising the temporary public key (K), the assertion proof (PA), the key proof (PK), the assertion (A), a message body and the assertion message signature (S),
    wherein at least one of the steps is carried out by a processor,
    wherein the temporary private key, the temporary public key (K) and the key proof (PK) are created by means of a secure binding function comprising a verifiable random function.

2. Method according to claim 1, wherein the step of creating the assertion message signature (S) comprises the sub-steps of
    creating an assertion message digest of one or more parts of the assertion message,
    creating the assertion message signature (S) from the assertion message digest by means of the temporary private key.

3. Method according to claim 1, wherein the assertion message signature (S) is an enveloped signature.

4. Method according to claim 1, wherein at least one of the assertion proof ($p_A$) and the key proof ($p_K$) is one of a zero knowledge proof and a minimum disclosure proof.

5. Method according to claim 1, wherein at least one of the assertion proof ($p_A$) and the key proof ($p_K$) is a non-interactive proof.

6. Method according to claim 1, wherein the temporary public key (K) and the temporary private key are a Digital Signature Algorithm (DSA) key pair.

7. Method according to claim 1, wherein the assertion message signature (S) is a signature according to the Extended Markup Language Digital Signature (XML-DSIG) standard.

8. Method according to claim 1, wherein the verifiable random function is the function as proposed by Dodis and Yampolsky.

9. Method according to claim 1, wherein the assertion proof ($p_A$) is derived from one or more private certificates of the proving party.

10. Method according to claim 1, wherein the method is performed in a Federated Identity Management (FIM) system, in particular in a WS-Federation system.

11. A method for a computing device having at least one processor evaluating an assertion message, the assertion message comprising an assertion (A) with one or more statements, an assertion proof (PA) for the assertion (A), a temporary public key (K) created from the assertion (A) and the assertion proof (PA), a key proof (PK) for the temporary public key (K), a message body and an assertion message signature (S), the method comprising the steps of:
    checking the temporary public key (K) by means of the key proof (PK),
    checking the assertion (A) by means of the assertion proof (PA),
    checking the assertion message signature (S) by means of the temporary public key (K), and
    evaluating the assertion message as valid if the result of the check of the assertion message signature (S), the temporary public key (K) and the assertion (A) is positive,
    wherein at least one of the steps is carried out by a processor,
    wherein the temporary private key, the temporary public key (K) and the key proof (PK) are created by means of a secure binding function comprising a verifiable random function.

12. A transmitting entity comprising a computing device having at least one processor for transmitting an assertion message from a proving party to a relying party, the transmitting entity comprising:
    a processor for:
    creating an assertion (A) comprising one or more statements,
    creating an assertion proof (PA),
    creating a temporary private key and a corresponding temporary public key (K) from the assertion (A) and the assertion proof (PA),
    creating a key proof (PK) for the temporary public key (K), and
    creating an assertion message signature (S) by means of the temporary private key, and
    a transmitting component for:
    sending the assertion message comprising the temporary public key (K), the assertion proof (PA), the key proof (PK), the assertion (A), a message body and the assertion message signature (S) to the relying party,
    wherein the temporary private key, the temporary public key (K) and the key proof (PK) are created by means of a secure binding function comprising a verifiable random function.

13. A receiving entity for receiving an assertion message from a proving party, the assertion message comprising an assertion (A) with one or more statements, an assertion proof (PA) for the assertion (A), a temporary public key (K) created from the assertion (A) and the assertion proof (PA), a key proof (PK) for the temporary public key (K), a message body and an assertion message signature (S), the receiving entity comprising:
- a receiving component for receiving the assertion message and for providing the assertion message to a processor for processing; and
- a processor for:
- checking the temporary public key (K) by means of the key proof (PK),
- checking the assertion (A) by means of the assertion proof (PA),
- checking the assertion message signature (S) by means of the temporary public key (K), and
- evaluating the assertion message as valid if the result of the check of the assertion message signature (S), the temporary public key (K) and the assertion (A) is positive,
- wherein the temporary private key, the temporary public key (K) and the key proof (PK) are created by means of a secure binding function comprising a verifiable random function.

14. A system, comprising a transmitting entity comprising a computing device having at least one processor for transmitting an assertion message from a proving party to a relying party, the transmitting entity comprising:
- a processor for:
- creating an assertion (A) comprising one or more statements,
- creating an assertion proof (PA),
- creating a temporary private key and a corresponding temporary public key (K) from the assertion (A) and the assertion proof (PA),
- creating a key proof (PK) for the temporary public key (K), and
- creating an assertion message signature (S) by means of the temporary private key, and
- a transmitting component for:
- sending the assertion message comprising the temporary public key (K), the assertion proof (PA), the key proof (PK), the assertion (A), a message body and the assertion message signature (S) to the relying party; and
- a receiving entity for receiving the assertion message from the proving party, comprising:
- a receiving component for receiving the assertion message and for providing the assertion message to a processor for processing; and
- a processor for:
- checking the temporary public key (K) by means of the key proof (PK),
- checking the assertion (A) by means of the assertion proof (PA),
- checking the assertion message signature (S) by means of the temporary public key (K), and
- evaluating the assertion message as valid if the result of the check of the assertion message signature (S), the temporary public key (K) and the assertion (A) is positive,
- wherein the temporary private key, the temporary public key (K) and the key proof (PK) are created by means of a secure binding function comprising a verifiable random function.

* * * * *